April 15, 1958 P. LE R. SMITH 2,830,360
AUTOMOBILE VALVE SPRING TOOL
Filed Dec. 2, 1954 4 Sheets-Sheet 1
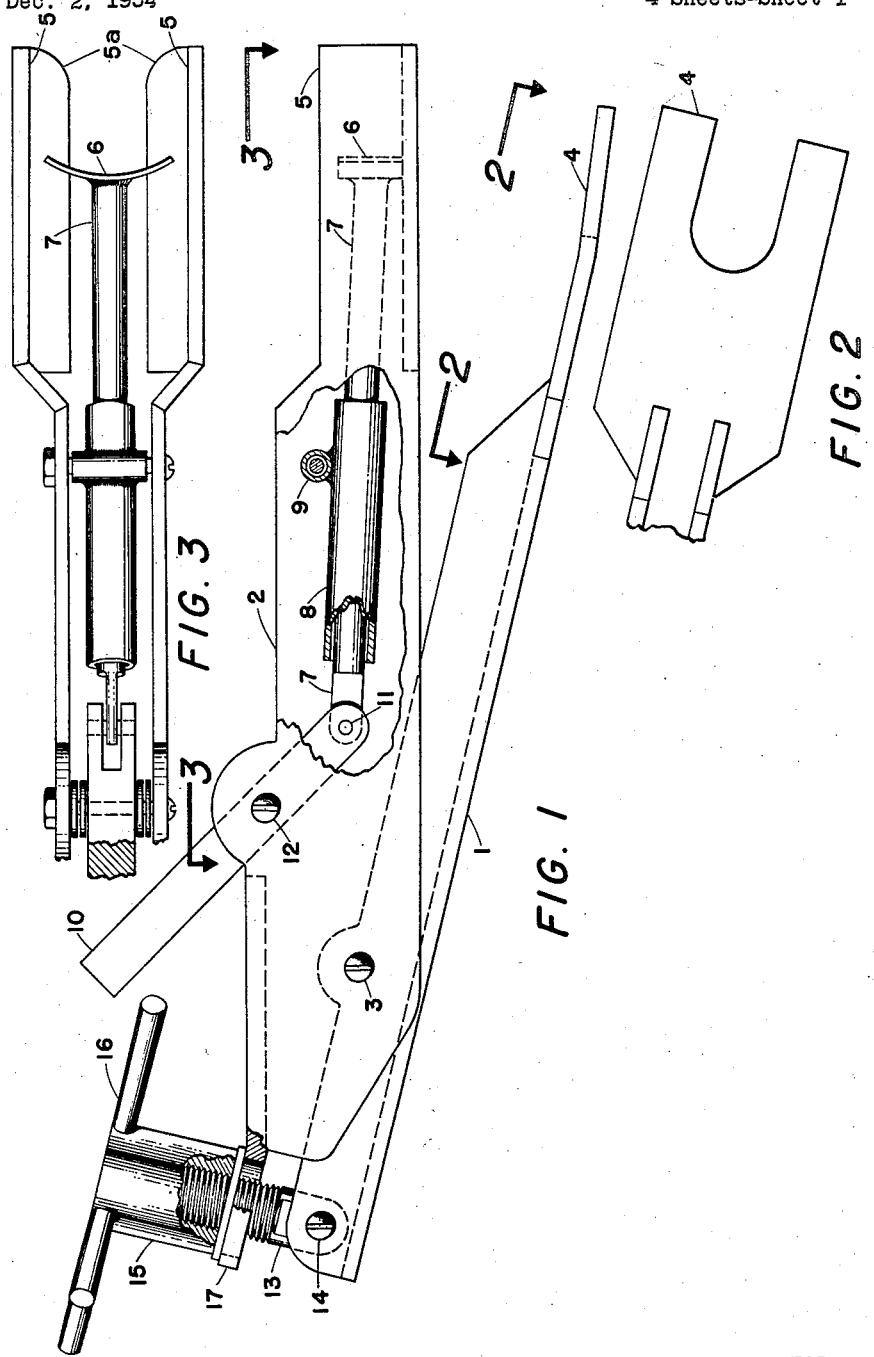
INVENTOR.
PERRY L. SMITH
BY
Floyd Trimble
ATTORNEY April 15, 1958 P. LE R. SMITH 2,830,360
AUTOMOBILE VALVE SPRING TOOL
Filed Dec. 2, 1954 4 Sheets-Sheet 2
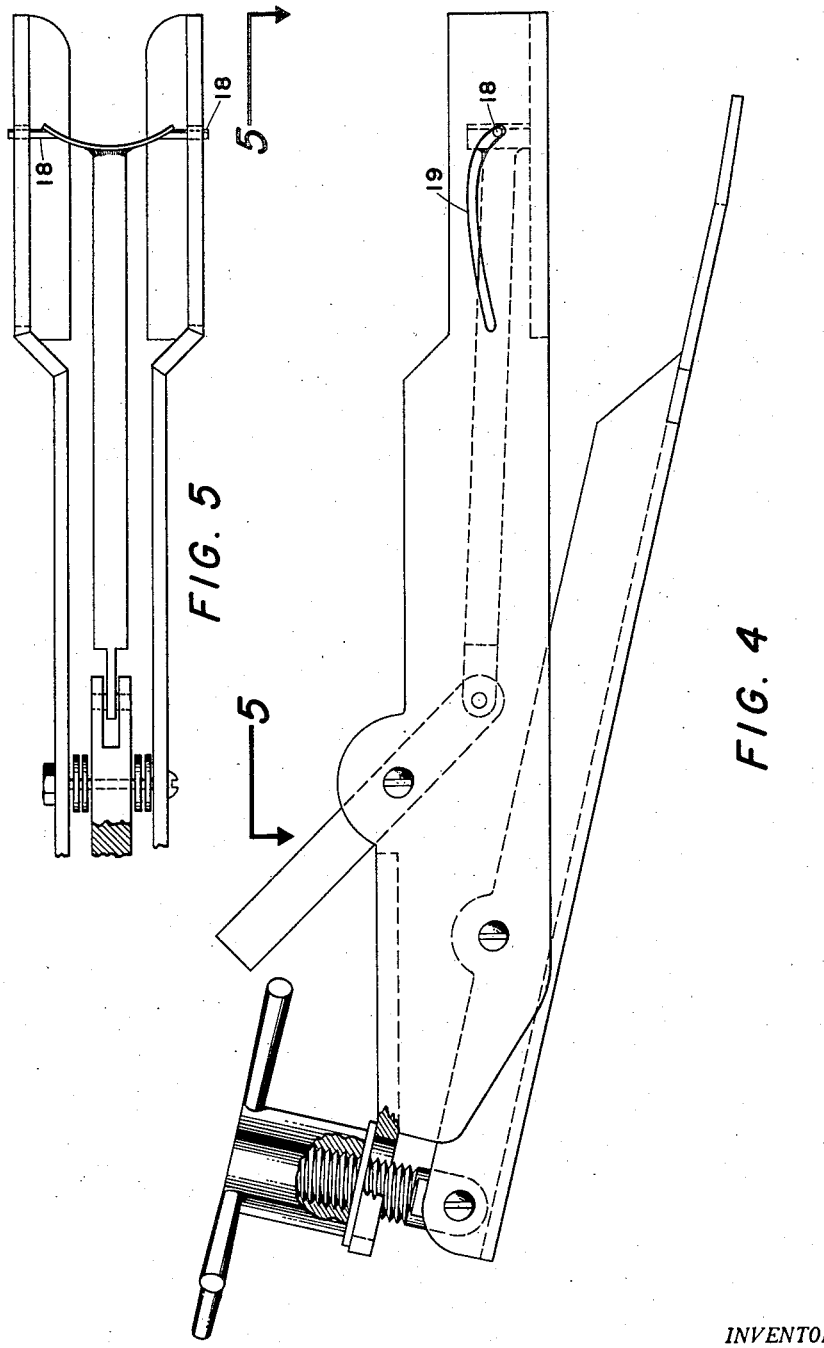
INVENTOR.
PERRY L. SMITH
BY
Floyd Trimble
ATTORNEY April 15, 1958 P. LE R. SMITH 2,830,360
AUTOMOBILE VALVE SPRING TOOL
Filed Dec. 2, 1954 4 Sheets-Sheet 3
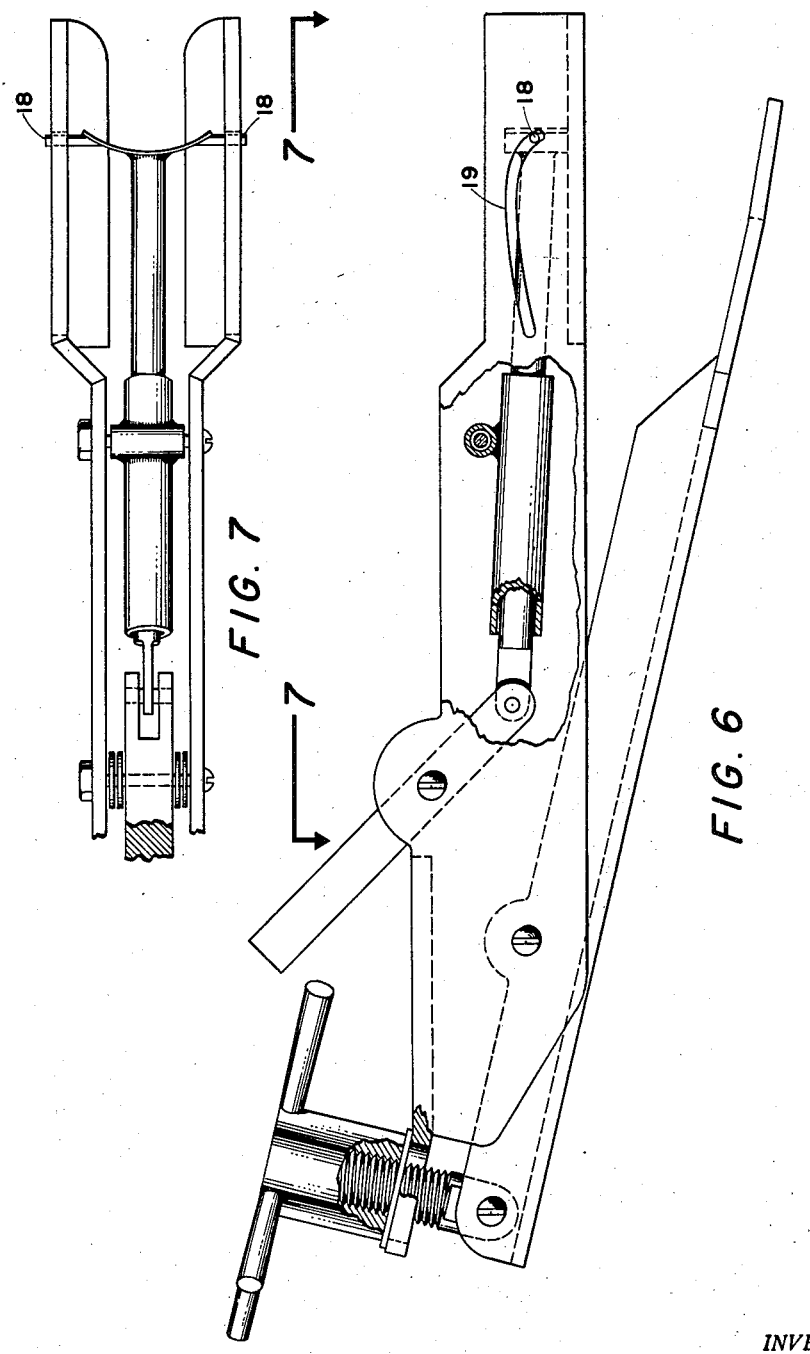
INVENTOR.
PERRY L. SMITH
BY
*Floyd Trimble*
ATTORNEY April 15, 1958 P. LE R. SMITH 2,830,360
AUTOMOBILE VALVE SPRING TOOL
Filed Dec. 2, 1954 4 Sheets-Sheet 4

INVENTOR.
PERRY L. SMITH
BY
Floyd Trimble
ATTORNEY

United States Patent Office

2,830,360
Patented Apr. 15, 1958

2,830,360

AUTOMOBILE VALVE SPRING TOOL

Perry Le Roy Smith, Ponca City, Okla.

Application December 2, 1954, Serial No. 472,698

4 Claims. (Cl. 29—218)

This invention relates to a tool to be used in connection with removing and installing valve springs in valve-in-block type of internal combustion engines.

In many of the later model cars the spring is of a very heavy type and unless the mechanic has a special tool for compressing this spring it is almost impossible to remove or install this spring. Heretofore it has not been possible to maintain concentricity of the valve spring to valve stem and as a result there has always been the danger of damaging the valve stem when the valve spring locks were removed or installed.

The principal object of the invention is to provide a tool which will greatly facilitate the compressing of the stiffest spring surrounding the valve stem with very little effort by the operator. Another object of my invention is to provide a tool which will maintain the valve spring straight, keeping valve spring locks free as the spring is compressed, thus facilitating removal of the valve spring locks without contacting the valve stem. Another object of this invention is to maintain concentricity of the valve spring to valve stem thus permitting installation of valve spring locks without possible damage to the valve stem. It is another object of the present invention to provide a method for the controlled release of the compressed spring to permit valve spring washer to positively contact both valve stem locks at the same time. Other objects will be disclosed in the specification and drawings.

In the accompanying drawings:

Figure 1 is a side elevation of a tool constructed in accordance with the present invention.

Figure 2 is a longitudinal section taken on line 2—2 of Figure 1 showing the lower jaw.

Figure 3 is a longitudinal section showing the spring engaging jaw containing the movable member for pushing a spring into place taken along the line 3—3 of Figure 1.

Figure 4 is a side elevation of the automobile valve spring tool showing one method of insuring that the valve spring pusher travels in an arc in reference to the horizontal plane of the spring engaging jaw.

Figure 5 is a longitudinal section showing the spring engaging jaw taken along the line 5—5 of Figure 4.

Figure 6 is a side elevation of the automobile valve spring tool showing another method of insuring that the valve spring pusher travels in an arc in reference to the horizontal plane of the spring engaging jaw.

Figure 7 is a longitudinal section showing the spring engaging jaw taken along the line 7—7 of Figure 6.

Figure 8:
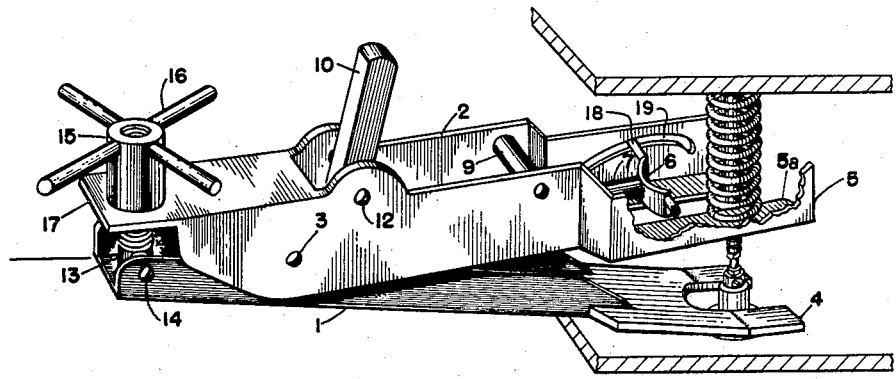
Fig. 8 is a side elevation showing the automobile valve spring tool engaging and compressing a valve spring in a valve-in-block type of internal combustion engine.

In the drawings similar reference numerals indicate coresponding parts in the different views. Numeral 1 designates one body member and numeral 2 designates the other body member which are pivotally mounted by the pivot 3. Numerals 4 and 5 are the lower and upper jaws, respectively, of the tool. As is shown in the drawings, pivot 3 is located at a point between the end of the body members opposite that end terminating in jaws 4 and 5. Jaw 4 is adapted to fit around a valve cam follower or tappet and is preferably bent toward the upper jaw. Jaw 5 is a spring engaging jaw and is preferably fitted with spring guides 5a. Numeral 6 designates a valve spring pusher. Numeral 7 designates a piston. Numeral 8 designates a cylinder pivoted at 9 which controls the smooth and positive movement of the piston 7. Numeral 10 designates a hand operable lever for the movement of the pusher 6, the movements of which are translated to the piston 7 and pusher 6 by means of the pivots 11 and 12. The relative movement of jaws 4 and 5 are controlled by means of movement of the threaded member 15 which engages jaw 17 operating upon the threaded member 13 pivoted at 14 by means of the hand operable lever 16.

Although the tool can be used if the valve spring pusher 6 travels along guides 5a in the same horizontal plane as that of the spring engaging jaw 5, there is a tendency for the valve spring to bind in the spring engaging jaw when so used. Better results are obtained if the valve spring pusher travels in an arc in reference to the horizontal plane of the spring engaging jaw. When the tool is so constructed that the valve spring pusher travels in such an arc there is no tendency for the valve spring to bind either in removing or reinstalling the valve spring assembly.

To insure that the pusher will travel in an arc cylinder 8 is pivoted at 9 through which the rod or piston 7 extends. Alternative methods of insuring that the pusher will travel in an arc are illustrated in Figures 4 and 6. In Figure 4 the valve spring pusher 6 terminates in the ends 18 which engage the curved slot 19. In Figure 6 a combination of the two methods is used. This combination employs both the pivot and slot.

Figure 9:
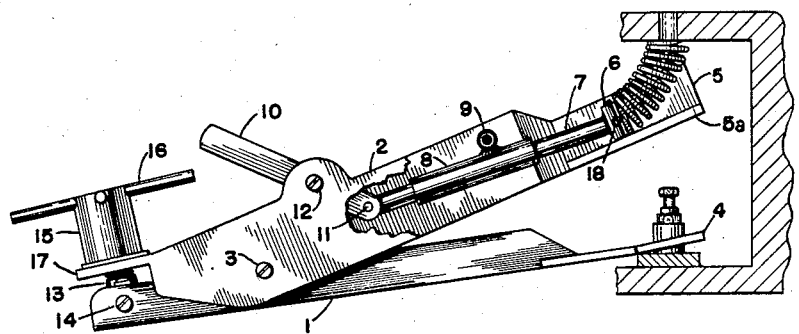
Fig. 9 is a side elevation of the automobile valve spring tool showing the valve spring partially removed from the engine block.

The operation of my device is as follows: Jaws 4 and 5 are inserted into the recessed valve chamber with jaw 5 placed against the bottom of the valve spring and jaw 4 on the bottom of the recessed valve chamber around the cam follower. To raise the valve spring, screw handle member 16 is turned clock-wise which operation forces jaws 4 and 5 apart which in turn causes the valve spring to be raised. This operation frees the valve stem locks which then can be removed. After the locks are removed as is illustrated in Fig. 8 the valve is removed from the engine block. After the valve has been removed pusher 6 is forced into contact with the spring. The tool is then pressed downward which causes the spring to start moving outwardly along the slide tracks 5a of jaw 5 as is illustrated in Fig. 9. This operation should be carefully performed. As the spring is tightly compressed there is a tendency of it flying out if not controlled during the downward movement. This is controlled by the pusher 6 allowing the spring to move slowly outward.

In re-installing the valve spring assembly jaws 4 and 5 are brought together after which they are inserted in the recessed valve chamber, the upper end of the valve spring is placed around the valve guide at the upper section of the valve chamber allowing the washer on the lower end of the valve spring to rest on upper jaw 5 and of valve spring guide 5a. Pusher 6 is then pushed forward to bring it into contact with the spring. Additional pressure on the pusher will cause the spring to move inwardly directly over the cam follower. The valve is then installed in position after which the valve spring is compressed by turning handle member 16 clockwise. Valve locks are then installed after which handle member 16 is rotated counter clock-wise allowing the washer on the lower end of the valve spring to move downwardly. When jaws 4 and 5 are brought sufficiently close together the tool is removed, which completes the operation.

It is apparent that many modifications and variations of the invention as hereinbefore set forth may be made without departing from the spirit and scope thereof. The examples given are by way of illustration only and the invention is limited only by the terms of the appended claims.

I claim:

1. In a hand operable tool for removing and replacing a valve spring in a valve-in-block type of internal combustion engine comprising a pair of pivotally connected body members, the juxtaposed ends of said body members terminating in upper and lower jaws, a movable member mounted in said upper jaw, wherein said body members are pivotally connected at a point between the midpoint and the end of said body members opposite said jaws, means for moving said movable member through an arc in reference to the horizontal plane of said upper jaw, a manually operable handle pivoted on said body member terminating in said upper jaw and pivotally connected with said movable member, means for relatively moving said jaws in a direction toward and from one another embodying a manually operable handle provided with a threaded opening bearing on the outer surface of one of said body members at the end opposite said jaws over an opening therein, and a threaded rod pivotally mounted on the end of said other body member juxtaposed said opening in said other body member said rod in threaded engagement with said threaded opening of said manually operable handle.

2. In a hand operable tool for removing and replacing a valve spring in a valve-in-block type of internal combustion engine comprising a pair of pivotally connected body members, the juxtaposed ends of said body members terminating in upper and lower jaws, a movable member mounted in said upper jaw, wherein said body members are pivotally connected at a point between the mid-point and the end of said body members opposite said jaws, means for moving said movable member through an arc in reference to the horizontal plane of said upper jaw consisting of a slotted arc in said upper jaw engaging the ends of said movable member, a manually operable handle pivoted on said body member terminating in said upper jaw and pivotally connected with said movable member, means for relatively moving said jaws in a direction toward and from one another embodying a manually operable handle provided with a threaded opening bearing on the outer surface of one of said body members at the end opposite said jaws over an opening therein, and a threaded rod pivotally mounted on the end of said other body member juxtaposed said opening in said other body member said rod in threaded engagement with said threaded opening of said manually operable handle.

3. In a hand operable tool for removing and replacing a valve spring in a valve-in-block type of internal combustion engine comprising a pair of pivotally connected body members, the juxtaposed ends of said body members terminating in upper and lower jaws, a movable member mounted in said upper jaw, wherein said body members are pivotally connected at a point between the midpoint and the end of said body members opposite said jaws, a manually operable handle pivoted on said body member terminating in said upper jaw and pivotally connected with said movable member by means of a rod engaged by a cylinder wherein said cylinder is hingedly mounted on said body member terminating in said upper jaw, means for relatively moving said jaws in a direction toward and from one another embodying a manually operable handle provided with a threaded opening bearing on the outer surface of one of said body members at the end opposite said jaws over an opening therein, and a threaded rod pivotally mounted on the end of said other body member juxtaposed said opening in said other body member said rod in threaded engagement with said threaded opening of said manually operable handle.

4. The tool of claim 1 whereby the circular movement of the movable member mounted in the spring engaging jaw is imparted by a slotted arc in said jaw engaging the ends of said movable member and the rod connected with said movable member is slidably mounted within the bore of a cylinder hingedly mounted on the body member terminating in said spring engaging jaw.

References Cited in the file of this patent

UNITED STATES PATENTS

| | | |
|---|---|---|
| 1,214,572 | Mertz | Feb. 6, 1917 |
| 1,246,969 | MacKeever | Nov. 20, 1917 |
| 1,467,439 | Lindenmuth | Sept. 11, 1923 |
| 1,489,561 | Tuveson | Apr. 8, 1924 |

U. S. DEPARTMENT OF COMMERCE
PATENT OFFICE

CERTIFICATE OF CORRECTION

Patent No. 2,830,360        Perry Le Roy Smith        April 15, 1958

It is hereby certified that error appears in the printed specification of the above numbered patent requiring correction and that the said Letters Patent should read as corrected below.

Column 3, line 16, beginning with "wherein" strike out all to and including "jaws," in line 19, and insert the same after "jaws," in line 15, same column; line 38, beginning with "wherein" strike out all to and including "jaws," in line 41, and insert the same after "jaws," in line 37, same column; column 4, line 16, beginning with "wherein" strike out all to and including "jaws," in line 19, and insert the same after "jaws," in line 15, same column.

Signed and sealed this 17th day of June 1958.

(SEAL)

Attest:

KARL H. AXLINE

Attesting Officer

ROBERT C. WATSON
Commissioner of Patents